(12) United States Patent
Roach et al.

(10) Patent No.: US 10,995,699 B2
(45) Date of Patent: May 4, 2021

(54) THRUST REVERSER CASCADE

(71) Applicant: MRA Systems, LLC., Baltimore, MD (US)

(72) Inventors: Andrew Michael Roach, Aberdeen, MD (US); Graham Frank Howarth, Middletown, DE (US); David Patrick Calder, Baltimore, MD (US)

(73) Assignee: MRA SYSTEMS, LLC., Baltimore, MD (US)

( * ) Notice: Subject to any disclaimer, the term of this patent is extended or adjusted under 35 U.S.C. 154(b) by 301 days.

(21) Appl. No.: 15/898,723

(22) Filed: Feb. 19, 2018

(65) Prior Publication Data
US 2019/0257268 A1 Aug. 22, 2019

(51) Int. Cl.
*F02K 1/72* (2006.01)
*F02K 1/54* (2006.01)
*F02K 1/64* (2006.01)

(52) U.S. Cl.
CPC .............. *F02K 1/72* (2013.01); *F02K 1/54* (2013.01); *F02K 1/64* (2013.01); *F05D 2220/323* (2013.01); *F05D 2230/20* (2013.01); *F05D 2230/31* (2013.01); *F05D 2230/51* (2013.01); *F05D 2240/129* (2013.01); *F05D 2300/603* (2013.01)

(58) Field of Classification Search
CPC ... F02K 1/62; F02K 1/625; F02K 1/70; F02K 1/72; F02K 1/80; F01D 9/02; F01D 9/04; F05D 2240/129; F05D 2230/60; F05D 2230/64
See application file for complete search history.

(56) References Cited

U.S. PATENT DOCUMENTS

| | | | | |
|---|---|---|---|---|
| 3,794,246 A | * | 2/1974 | Weise | F02K 1/56 239/265.33 |
| 3,859,787 A | * | 1/1975 | Anderson | F02C 7/12 60/737 |
| 4,067,094 A | * | 1/1978 | Ittner | B23P 15/006 239/265.29 |
| 4,173,307 A | * | 11/1979 | Ittner | B23P 15/006 239/265.29 |
| 4,722,821 A | | 2/1988 | Vermilye | |
| 9,527,238 B2 | * | 12/2016 | Kruckenberg | B29C 66/301 |
| 9,587,582 B1 | * | 3/2017 | Schaefer | F02K 1/72 |
| 9,835,112 B2 | | 12/2017 | Calder | |

(Continued)

FOREIGN PATENT DOCUMENTS

| CN | 105221294 A | 1/2016 |
|---|---|---|
| EP | 2 944 452 A2 | 11/2015 |

(Continued)

OTHER PUBLICATIONS

European Search Report issued in related European patent application No. 19157392.2, dated Jul. 2, 2019.

(Continued)

*Primary Examiner* — Andrew H Nguyen
(74) *Attorney, Agent, or Firm* — Xsensus LLP

(57) ABSTRACT

A thrust reverser cascade can include a peripheral frame having at least one side. At least one plate can be mounted to the at least one side and have a plurality of spaced grooves. In addition, a plurality of vanes can include corresponding terminal ends positioned in the plurality of spaced grooves.

24 Claims, 4 Drawing Sheets

(56) References Cited

U.S. PATENT DOCUMENTS

| | | | |
|---|---|---|---|
| 2010/0071560 A1* | 3/2010 | Daniel | B01D 50/002 |
| | | | 96/189 |
| 2015/0226157 A1* | 8/2015 | Calder | B33Y 80/00 |
| | | | 60/228 |
| 2015/0285184 A1 | 10/2015 | Sawyers-Abbott | |
| 2016/0047333 A1 | 2/2016 | Starovic | |
| 2016/0186689 A1 | 6/2016 | Bartel | |
| 2017/0022829 A1* | 1/2017 | Freeman | F01D 9/041 |
| 2017/0057166 A1* | 3/2017 | Soria | F02K 1/56 |
| 2017/0370325 A1 | 12/2017 | Fert | |

FOREIGN PATENT DOCUMENTS

| | | | |
|---|---|---|---|
| EP | 2944452 A2 | 11/2015 | |
| FR | 3048025 A1 | 8/2017 | |

OTHER PUBLICATIONS

Chinese Office Action dated Jan. 5, 2021 in Chinese Application No. 201910123958.2.

* cited by examiner

THRUST REVERSER CASCADE

BACKGROUND

Turbine engines, and particularly gas or combustion turbine engines, are rotary engines that extract energy from a flow of combusted gases passing through the engine onto a multitude of turbine blades. Turbine engines have been used for land and nautical locomotion and power generation, but are most commonly used for aeronautical applications such as aircraft.

Thrust reverser cascades can be used within turbine engines, including turbofan engines, to provide a reverse thrust, e.g. for reducing speed of an aircraft such as during landing. Reverse thrust can be achieved by deploying a door assembly into a bypass duct, and air can be diverted from an aft direction to a forward direction by way of the cascade.

BRIEF DESCRIPTION

In one aspect, the disclosure relates to a thrust reverser cascade including a peripheral frame having at least one side and made from a composite layup of multiple layers of woven fiber and resin, at least one plate mounted to the at least one side and having a plurality of spaced grooves, the plate being made from one of fiber-filled thermoplastic or fiber-filled thermoset material, and a plurality of vanes having corresponding terminal ends positioned in the plurality of spaced grooves, the plurality of vanes being made from fiber-reinforced resin.

In another aspect, the disclosure relates to a thrust reverser cascade including a peripheral frame having at least one side and made from a fiber composite having fibers of a first length, at least one plate mounted to the at least one side and having a plurality of spaced grooves, the plate being made from a fiber composite having fibers of a second length, which is less than the first length, and a plurality of vanes having corresponding terminal ends positioned in the plurality of spaced grooves.

In yet another aspect, the disclosure relates to a method of assembling a thrust reverser cascade. The method includes mounting a plate made from fiber-reinforced composite to a side of a peripheral frame made from a composite layup of multiple layers of woven carbon fiber and resin, and fitting a terminal end of a vane made from fiber-reinforced resin into a groove in the plate.

DETAILED DESCRIPTION

Figure 1:
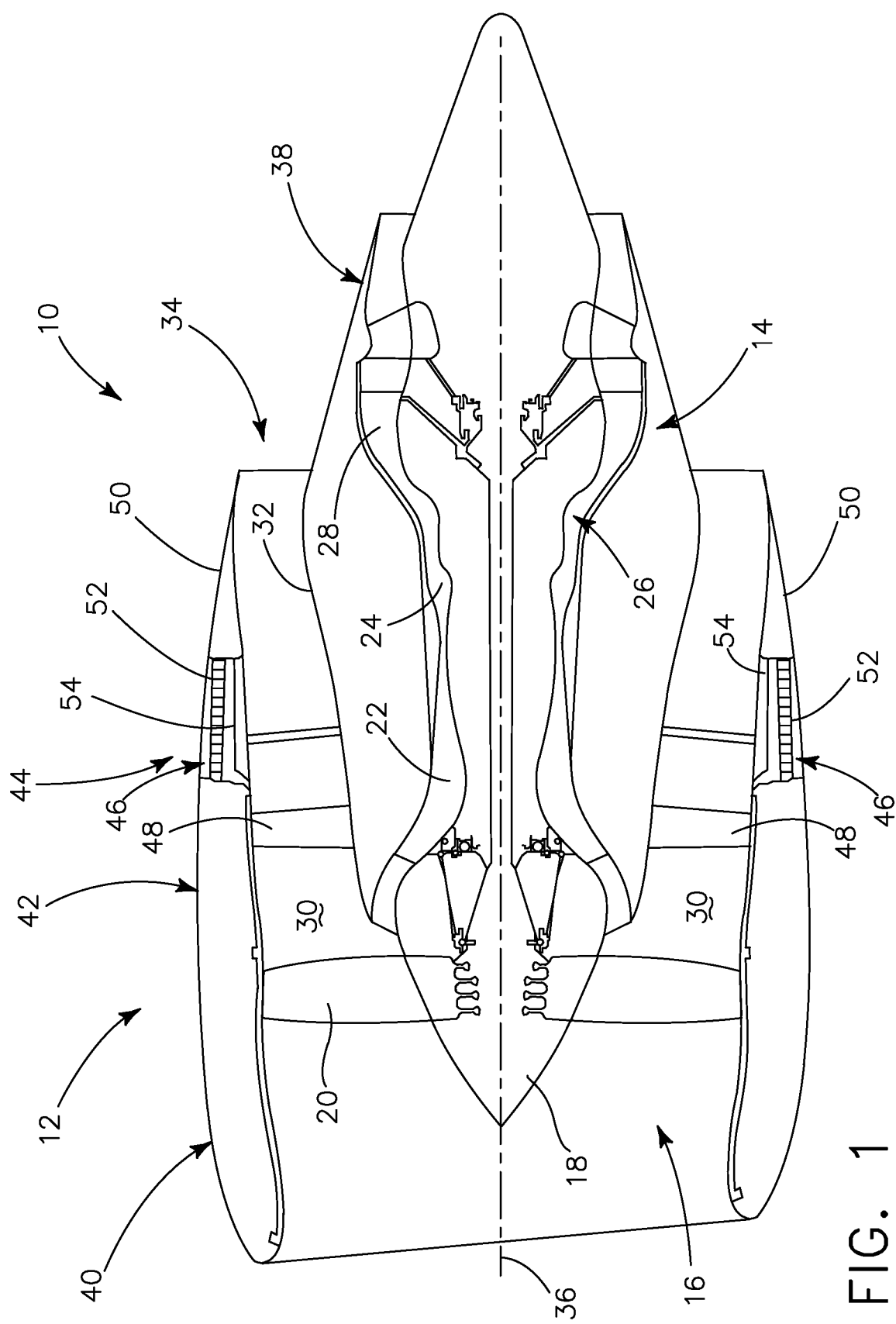
FIG. 1 is a schematic cross-sectional diagram of a turbine engine for an aircraft including a thrust reverser cascade in accordance with various aspects described herein.

The described aspects of the present disclosure are directed to a thrust reverser assembly, particularly in a turbine engine or turbofan engine. For purposes of illustration, the present disclosure will be described with respect to an aircraft turbofan engine. It will be understood, however, that the present disclosure is not so limited and can have general applicability in non-aircraft applications.

Traditional thrust reversers for medium to large turbofan engines can utilize a translating cowl design in which the translating cowl is translated axially aft to expose the cascades. A series of blocker doors can be rotated by this action to block the fan duct and re-direct flow through the cascades, which have a plurality of vanes for turning the flow forward to provide reverse thrust. The axial movement is typically achieved with a number of telescopic electrical, hydraulic or pneumatic actuators controlled and synchronized together. Traditional cascades are typically made from cast aluminum or graphite/resin composite materials, and can use a multitude of vanes to generate reverse fan flow. It should be understood that while described with respect to a thrust reverser cascade, aspects of the present disclosure can be applied to any component for a turbine engine.

As used herein, the term "forward" or "upstream" refers to moving in a direction toward the engine inlet, or a component being relatively closer to the engine inlet as compared to another component. The term "aft" or "downstream" refers to a direction toward the rear or outlet of the engine relative to the engine centerline.

Additionally, as used herein, the terms "radial" or "radially" refer to a dimension extending between a center longitudinal axis of the engine and an outer engine circumference.

It should be further understood that "a set" can include any number of the respectively described elements, including only one element.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present disclosure, and do not create limitations, particularly as to the position, orientation, or use of the present disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 schematically represents a gas turbine engine illustrating a thrust reverser assembly shown as a high-bypass turbofan engine 10 of a type known in the art. The engine 10 is schematically represented as including a nacelle 12 surrounding at least a portion of a core engine 14. A nacelle interior 46 can be defined by the nacelle 12. The engine 10 has a generally longitudinal extending axis or centerline 36 extending forward to aft. A fan assembly 16 located in front of the core engine 14 includes a spinner nose 18 projecting forwardly from an array of fan blades 20. The core engine 14 is schematically represented as including a high-pressure compressor 22, a combustor 24, a high-pressure turbine 26 and a low-pressure turbine 28. A large portion of the air that enters the fan assembly 16 is bypassed to the rear of the engine 10 to generate engine thrust. The bypassed air passes through an annular-shaped bypass duct 30 defining a fore-to-aft airflow conduit 31 between the nacelle 12 and an inner core cowl 32, and exits the bypass duct 30 through a fan exit nozzle 34. The inner core cowl 32 defines the radially inward boundary of the bypass duct 30, and provides a transition surface to a primary exhaust nozzle 38 that extends aft from the core engine 14. The nacelle 12 defines the radially outward boundary of the bypass duct 30. The bypassed fan air can flow through the bypass duct 30 defined by the nacelle 12 and inner core cowl 32 before being exhausted through the fan exit nozzle 34. One or more outlet guide vanes 48 can be provided within the bypass duct 30 downstream of the fan blades 20. The outlet guide vanes 48 can induce a helical, circumferential component on a flow of fluid driven by the fan, or can turn a circumferential flow to an axial flow.

The nacelle 12 can include three primary elements that define the external boundaries of the nacelle 12: an inlet assembly 40, a fan cowl 42 interfacing with an engine fan case that surrounds the fan blades 20, and a thrust reverser assembly 44 located aft of the fan cowl 42. The thrust reverser assembly 44 can include three primary components: a translating cowl 50 mounted to the nacelle 12, a thrust reverser cascade 52 (also referred to herein as a "cascade" 52) schematically represented within the nacelle 12, and multiple blocker doors 54 adapted to be pivotally deployed from a stowed position, shown in FIG. 1, where the blocker door 54 is radially inward from the thrust reverser cascade 52. The inner core cowl 32 of the core engine 14 is also part of the thrust reverser assembly 44, and the fore end of the blocker door 54 is pivoted into engagement or close proximity with the inner core cowl 32 when the blocker door 54 is fully deployed.

The thrust reverser cascade 52 can be a fixed structure of the nacelle 12 in one non-limiting example, whereas the translating cowl 50 is adapted to be translated aft to expose the cascade 52 and deploy the blocker door 54 into the bypass duct 30, causing bypassed air within the bypass duct 30 to be diverted through the exposed cascade 52 and thereby provide a thrust reversal effect. In another non-limiting example, the thrust reverser cascade 52 can be configured to translate aft with the translating cowl 50. Other configurations of the thrust reverser cascade 52 not explicitly described can also be used within the thrust reverser assembly 44. While two blocker doors 54 are shown in FIG. 1, a set of blocker doors 54 are typically circumferentially spaced around the nacelle 12.

Figure 2:
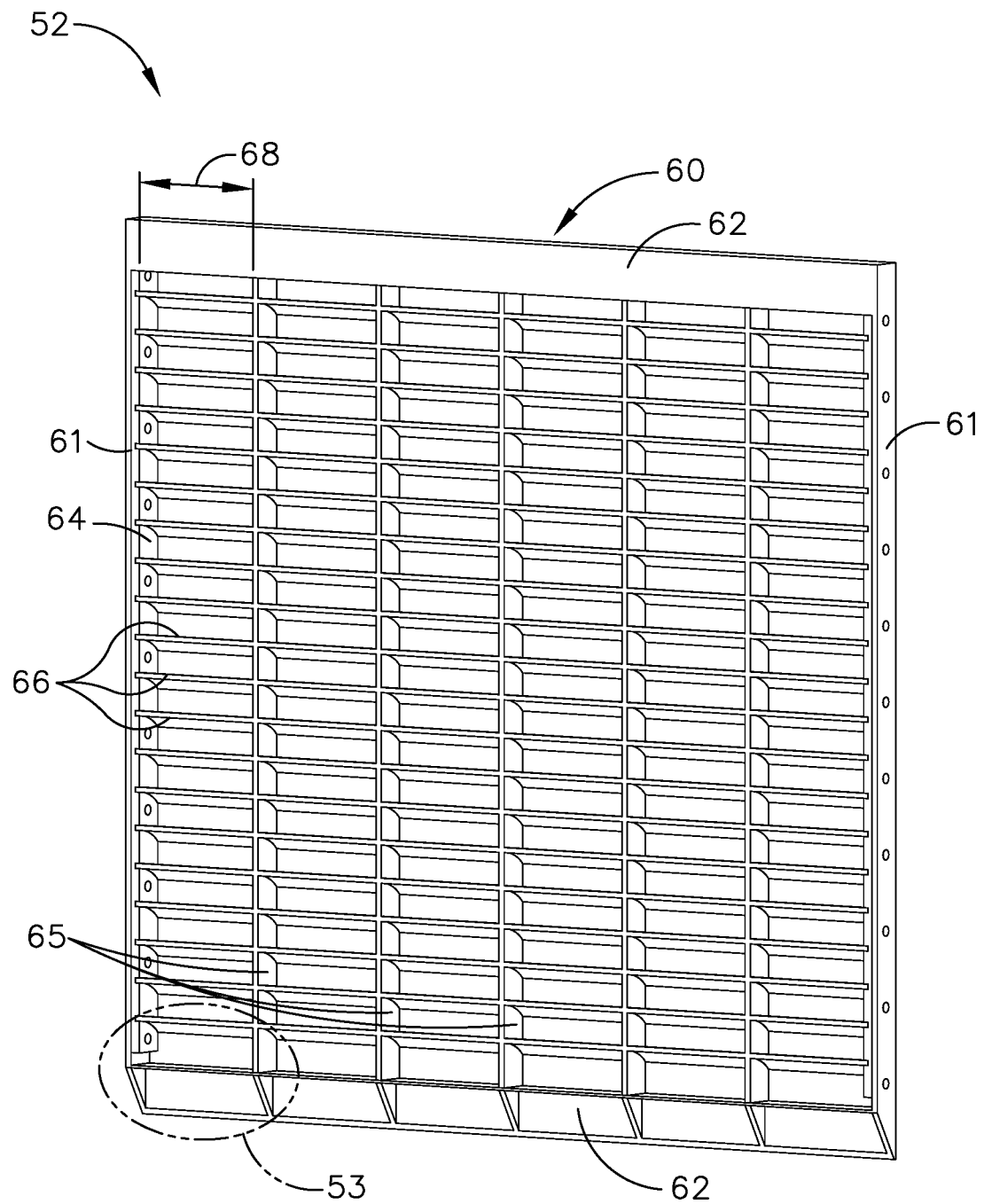
FIG. 2 is an assembled view of the thrust reverser cascade of FIG. 1.

Referring now to FIG. 2, a thrust reverser cascade 52 is illustrated in further detail. The cascade 52 can include a peripheral frame 60 with opposing frame sides 61 connected by opposing frame ends 62 (which are also known in the art as bulkheads). The peripheral frame 60 can be made from a composite layup of multiple layers of woven carbon fiber and epoxy, and is illustrated herein with a rectangular shape. It will be understood that other geometric profiles including square, rounded, or rectangular with curved sides are also contemplated for use in the cascade 52. Furthermore, the peripheral frame 60 can also be made by resin transfer molding, or injection molding, including with fiber reinforcement in non-limiting examples. While the opposing frame ends 62 are illustrated as having linear profiles, it is also contemplated that the frame sides 61 or frame ends 62 can have a curved cross-sectional shape in an example where multiple thrust reverser cascades 52 are circumferentially arranged around the nacelle 12 (FIG. 1).

At least one plate 64 can be made from injection-molded, fiber-reinforced composite, including carbon-fiber-reinforced thermoplastic or a carbon-fiber-reinforced thermoset material. The plate 64 can be mounted to at least one of the opposing frame sides 61.

A plurality of vanes 66 having a length 68 can be included in the cascade 52 and are positioned within the peripheral frame 60 between the plates 64. In the example of FIG. 2, stiffeners 65 can also be mounted within the peripheral frame 60 between the frame ends 62 and supporting at least some of the plurality of vanes 66. In this manner, the plurality of vanes 66 can be arranged in a grid or array. In another example, the vanes 66 can each have varying lengths 68 in different regions of the cascade 52, e.g. through use of curved frame sides 61. In still another example, the vanes 66 can have sufficient lengths 68 to extend fully between the opposing frame sides 61.

Figure 3:
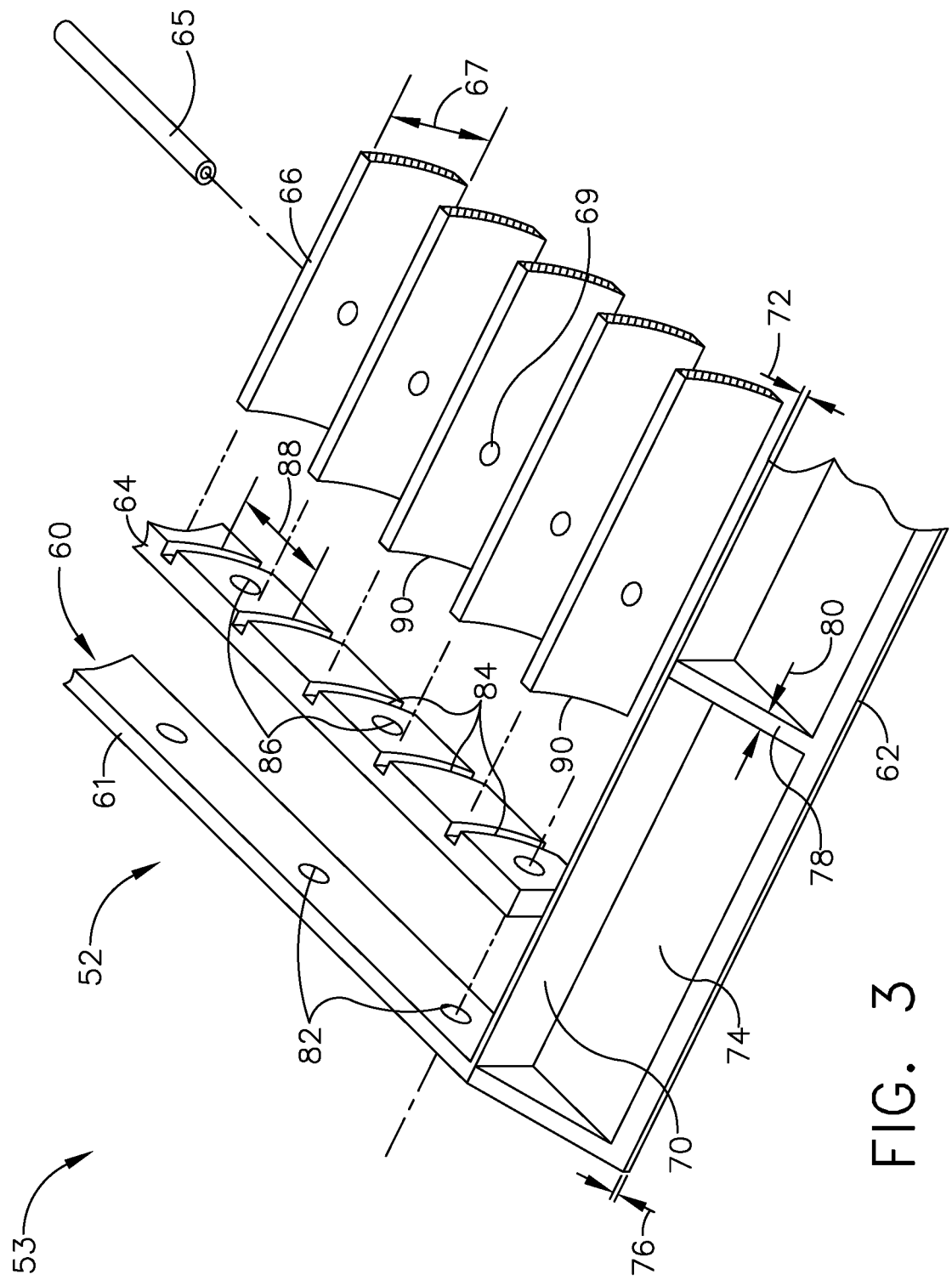
FIG. 3 is an exploded view of a portion of the thrust reverser cascade of FIG. 1.

A portion 53 of the thrust reverser cascade 52 is illustrated in FIG. 3 in a partially-exploded view, and is shown with the peripheral frame 60, plate 64, a set of vanes 66, and an exemplary stiffener 65. The frame end 62 includes an L-shaped profile defining a first leg 70 having a first thickness 72 as well as a second leg 74 having a second thickness 76. At least one gusset 78 having a gusset thickness 80 can connect the first and second legs 70, 74. In the example of FIG. 3 the first thickness 72, second thickness 76, and gusset thickness 80 are illustrated as being equal to one another; it is also contemplated that the first thickness 72 can be greater than the second thickness 76, or that the second thickness 76 can equal the gusset thickness 80, in non-limiting examples. In addition, the frame side 61 is illustrated with a set of frame apertures 82 configured to receive a fastener (not shown) such as a bolt, screw, or other desired fastener.

The molded plate 64 can further include a set of plate apertures 86 as well as a plurality of spaced grooves 84. The plate apertures 86 can be configured to receive a fastener (not shown), and in this manner the plate 64 can be mechanically attached to the frame side 61. It is also contemplated that other attachment mechanisms can be utilized to couple the plate 64 to the frame side 61 including the use of adhesives, press-fitting, or other desired attachments.

The grooves 84 can be spaced apart by a distance 88, where a plate aperture 86 can be positioned between adjacent grooves 84. In addition, the grooves 84 can also be formed with curved profiles as illustrated. While each groove is illustrated as being continuous, it is also contemplated that a groove 84 can be discontinuous, e.g. a dovetail or lap joint, or can also include an abutment (not shown) to accommodate lower height vanes 66.

The vanes 66 can further include a height 67 as shown. It is contemplated that the vanes 66 can have any desired cross-sectional profile including include an airfoil cross-section, a flat cross-section, or a curvilinear cross-section, in non-limiting examples. The vanes 66 can also have opposing terminal ends 90 which can also include curved profiles which are complementary to the curved grooves 84. It is also contemplated that the vanes 66 can be coupled to the grooves 84 via adhesive bonding or other suitable attachments. Furthermore, each vane 66 can include at least one vane aperture 69 configured to receive the stiffener 65. The stiffener 65 is illustrated in the form of a hollow cylinder; other non-limiting examples of geometric profiles that can be used for the stiffener 65 include a solid cylinder, square cylinder, rectangular plate, curvilinear plate, or irregular/asymmetric profile. Regardless of the geometric profile used in the stiffener 65, the vane aperture 69 can have a complementary geometric profile for receipt of the stiffener 65 during assembly.

When assembled, the terminal ends 90 of the vanes 66 can be positioned in the plurality of spaced grooves 84 in the thrust reverser cascade 52. The plate apertures 86 can be positioned in registry with the frame apertures 82 and secured with a bolt or other fastener (not illustrated); in an alternate example, the plate 64 can be coupled to the frame side 61 using other means including adhesives as described above. In this manner the assembled vanes 66, plates 64, and peripheral frame 60 can form at least a portion of the thrust reverser cascade 52.

Figure 4:
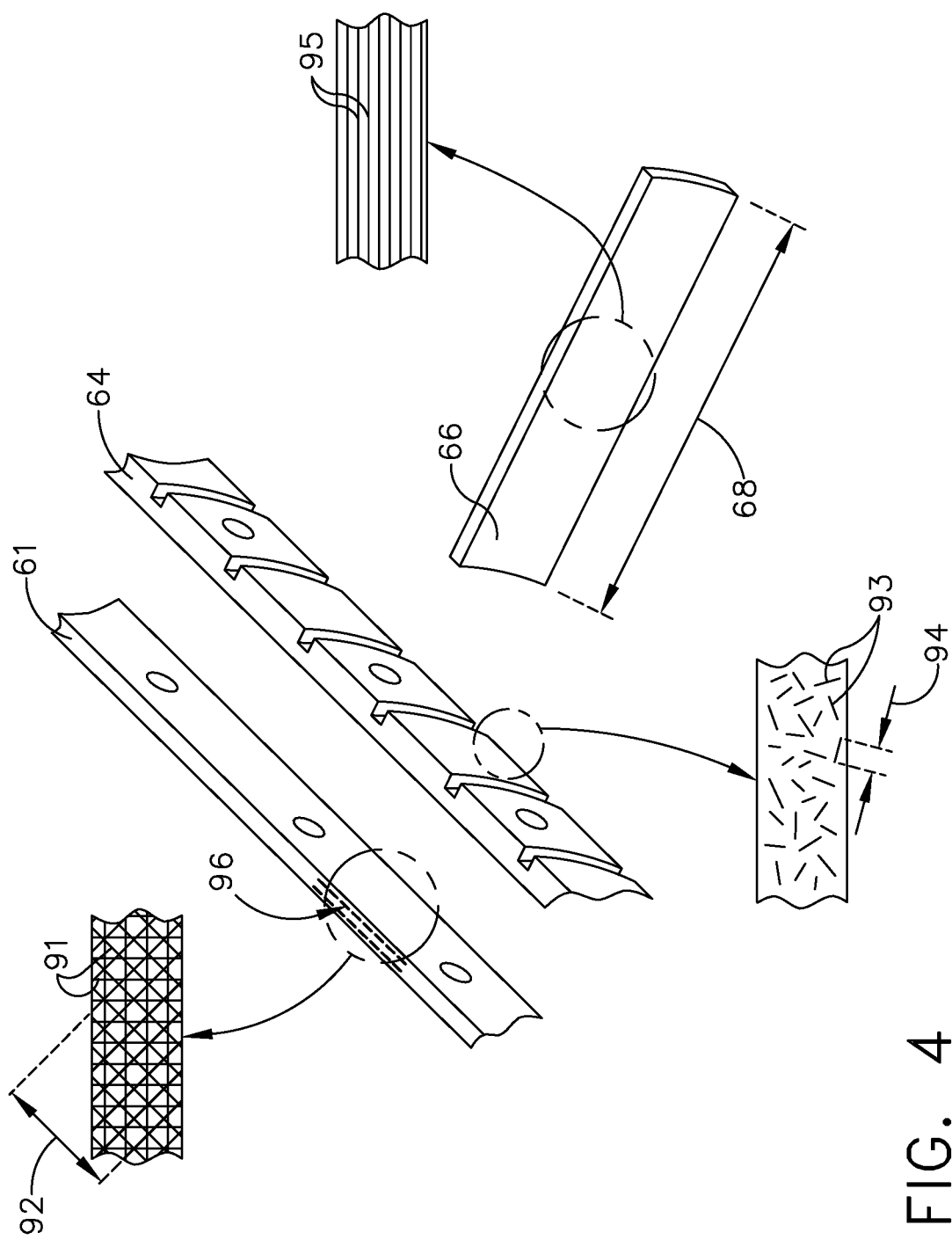
FIG. 4 illustrates carbon fibers within the thrust reverser cascade of FIG. 3.

Turning to FIG. 4, various aspects of material properties of the cascade 52 are illustrated. The frame sides 61 can include frame fibers 91 having a first length 92. In one non-limiting example, the frame sides 61 and frame ends 62 can be manufactured by layup of woven graphite frame fibers 91 to form a set of woven layers or plies 96 impregnated with resin, including epoxy resin or polymer resin. In another non-limiting example, resin transfer molding can also be utilized to infuse the woven plies 96 with epoxy resin. The woven graphite frame fibers 91 can provide multi-directional structural capability to sustain the transferred air loads from the vanes 66, as well as the thrust reverser overall loads or deflections resulting from the cascade 52 as an integrated part of the thrust reverser structure. In still another example, the frame fibers 91 can include fiberglass to provide reinforcement for the peripheral frame 60.

The plates 64 can include plate fibers 93 having a second length 94. The side plates 64 can be manufactured by additive manufacturing or injection molding a polymer material, and the polymer material can be reinforced using fiberglass plate fibers 83 or graphite plate fibers 93, including fiberglass or graphite woven fiber pre-forms. It can be appreciated that the plate fibers 93 can enhance the ability of the plates 64 to carry air loads transferred from the vanes 66 and to improve the shear load carrying capability to sustain the load transfer through attachments into the side frame 61. It is further contemplated that the first length 92 of the frame fibers 91 can be longer than the second length 94 of the plate fibers 93.

The vanes 66 can be manufactured by additive manufacturing or pultrusion using a thermoset or thermoplastic resin in conjunction with continuous vane fibers 95 aligned along the length 68 of the vanes 66. The vane fibers 95 can include fiberglass or graphite fibers; such fiber reinforcement can provide fatigue durability and increased strength or stiffness along the length 68 to sustain the reverse air loads resulting from thrust reverser operation. It is anticipated that the vanes 66 can be shaped (e.g. an airfoil cross-section or a curved, constant-thickness cross-section) in order to optimize the performance of the cascade 52. Furthermore, the axially-reinforced plates 64 and axial stiffeners 65 can be utilized to stiffen the vanes 66 and peripheral frame 60 for increased rigidity and strength in operation.

In operation, when the translating cowl 50 (FIG. 1) is deployed aft from its stowed position, the bypassed fan air can be directed outwards through the thrust reverser cascade 52 to provide reverse thrust for the engine 10. Air flowing through the cascade 52 and past the vanes 66 (FIG. 3) can generate radial loads on the plates 64; it can be appreciated that the shorter plate fibers 93 (FIG. 4) can provide added bearing strength against the terminal ends 90 (FIG. 3) of the vanes 66. In addition, the lengthwise vane fibers 95 (FIG. 4) within the pultruded vanes 66 can also provide increased strength or stiffness along the length 68 of each vane 66, and the woven frame fibers 91 can provide material strength in multiple directions within the peripheral frame 60.

A method of assembling the thrust reverser cascade 52 includes mounting the plate 64 to the frame side 61, where the plate 64 is made from carbon fiber filled thermoplastic and the frame side 61 is made from the composite layup as described in FIG. 2. The mounting can be accomplished via a mechanical fastener inserted through the frame apertures 82 and plate apertures 86 as described in FIG. 3, or by way of adhesives or other desired coupling mechanisms. In addition, the vane 66 can be pultruded and cut to a desired length 68, forming the terminal end 90 which can be fitted into the groove 84 in the plate 64, including by way of the complementary geometry as described in FIG. 3, to assemble the thrust reverser cascade 52. It is further contemplated that the plate 64 and vane 66 can be coupled via adhesives or any other desired coupling mechanism.

Aspects of the present disclosure provide for a variety of benefits. It can be appreciated that the three-way manufacturing approach of forming a composite layup for the peripheral frame, injection molding the plates, and pultruding the vanes can result in a hybrid cascade with increased structural capability and low manufacturing complexity compared with other thrust reverser cascades in the prior art. In addition, the individual manufacturing processes (e.g. injection molding, layup, pultrusion, resin transfer molding, and additive manufacturing) can provide for parallel manufacturing of subcomponents across manufacturers, which can reduce costs and improve process efficiencies. Further, the modular construction of the exemplary thrust reverser cascade can facilitate repair of the cascade by replacement of individual components such as vanes or plates, whereas a prior art cascade would typically be replaced in its entirety.

In addition, aspects of the present disclosure can provide optimized performance of the cascade, as well as matching the fan duct flow distribution into the cascades. Furthermore, the vanes within the cascade can be varied individually or in groups, or with different geometrical profiles, lengths, or heights, which provides a tuning capability for exit flow velocity and angle.

This written description uses examples to disclose the present disclosure, including the best mode, and to enable any person skilled in the art to practice the present disclosure, including making and using any devices or systems and performing any incorporated methods. The patentable scope of the present disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A thrust reverser cascade comprising:
a peripheral frame having at least one side and made from a composite layup of multiple layers of woven fiber and resin;
at least one plate mounted directly to the at least one side and having a plurality of spaced grooves, a longest dimension of the at least one plate is parallel to a longest dimension of the at least one side, and the at least one plate being made from one of fiber-filled thermoplastic or fiber-filled thermoset material; and
a plurality of vanes each having a longest surface with corresponding terminal ends of the longest surface positioned in a corresponding one of the plurality of spaced grooves, the plurality of vanes being made from continuous fiber-reinforced resin, wherein the plurality of vanes are configured to direct flow in a forward direction; and
wherein the at least one plate is connected with the at least one side at a plurality of attachment points that are spaced along the longest dimension of the at least one side, wherein the plurality of attachment points each include a fastener inserted through corresponding holes in the at least one plate and the at least one side, the plurality of attachment points including a point between, in the longest dimension of the at least one side, two adjacent grooves of the plurality of spaced grooves.

2. The thrust reverser cascade of claim 1 wherein the fibers of the peripheral frame are longer than the fibers of the at least one plate.

3. The thrust reverser cascade of claim 1 wherein the peripheral frame is rectangular and the at least one side further comprises opposing sides connected by opposing ends.

4. The thrust reverser cascade of claim 3 wherein the opposing ends have L-shaped profiles to define first and second legs, with at least one gusset connecting the first and second legs.

5. The thrust reverser cascade of claim 4 wherein the opposing ends have linear profiles.

6. The thrust reverser cascade of claim 1 wherein a shape of each of the spaced grooves and a cross-sectional shape of the one of the plurality of vanes positioned therein are complementary.

7. The thrust reverser cascade of claim 6 wherein the shape of each of the spaced grooves is curved.

8. The thrust reverser cascade of claim 1 wherein the at least one plate is formed by additive manufacturing or injection molding.

9. The thrust reverser cascade of claim 1 wherein the plurality of vanes are pultruded.

10. The thrust reverser cascade of claim 1 wherein the plurality of vanes are arranged in a grid.

11. The thrust reverser cascade of claim 1 wherein the fibers of the peripheral frame, the fibers of the at least one plate, or the fibers of the plurality of vanes comprise fiberglass or carbon fibers.

12. The thrust reverser cascade of claim 1 further comprising a stiffener supporting at least some of the plurality of vanes within the peripheral frame.

13. The thrust reverser cascade of claim 12 wherein the stiffener comprises a hollow cylinder, solid cylinder, square cylinder, rectangular plate, curvilinear plate, or irregular geometric profile.

14. The thrust reverser cascade according to claim 1, wherein the at least one side includes two opposing sides, and each of the at least one plate is mounted to only one of the two opposing sides.

15. The thrust reverser cascade according to claim 1, wherein each of the at least one plate includes the plurality of spaced grooves arranged on a same side of the corresponding at least one plate.

16. The thrust reverser cascade according to claim 1, wherein the plurality of spaced grooves are spaced apart from each other along a longest dimension of each of the at least one plate.

17. The thrust reverser cascade according to claim 1, wherein each of the plurality of vanes has a curved shape and each of the plurality of spaced grooves is curved with the curved shape of the one of the plurality of vanes positioned therein.

18. The thrust reverser cascade according to claim 1, wherein the terminal end of the longest surface of each of the plurality of vanes is in direct contact with a corresponding one of the plurality of spaced grooves.

19. The thrust reverser cascade according to claim 1, wherein each of the plurality of spaced grooves is configured to have only one of the plurality of vanes positioned therein.

20. A thrust reverser for a turbine engine comprising:
a cascade including a peripheral frame having at least one side and made from a fiber composite having fibers of a first length;
at least one plate mounted directly to the at least one side and having a plurality of spaced grooves, a longest dimension of the at least one plate is parallel to a longest dimension of the at least one side, and the at least one plate being made from a fiber composite having fibers of a second length, which is less than the first length; and
a plurality of vanes each having a longest surface with corresponding terminal ends of the longest surface positioned in a corresponding one of the plurality of spaced grooves, wherein the plurality of vanes are configured to direct flow in a forward direction; and
wherein the at least one plate is connected with the at least one side at a plurality of attachment points that are spaced along the longest dimension of the at least one side, wherein the plurality of attachment points each include a fastener inserted through corresponding holes in the at least one plate and the at least one side, the plurality of attachment points including a point between, in the longest dimension of the at least one side, two adjacent grooves of the plurality of spaced grooves.

21. The thrust reverser of claim 20 wherein at least one of the fibers of the peripheral frame and the fibers of the at least one plate further comprise carbon fibers or fiberglass.

22. The thrust reverser of claim 20 wherein the peripheral frame is made from one of resin transfer molding, injection molding, or composite layup.

23. The thrust reverser of claim 20 wherein the spaced grooves and the terminal ends have complementary profiles.

24. The thrust reverser of claim 20 wherein the plurality of vanes are arranged in a grid.

* * * * *